(12) United States Patent
Krishnaswamy et al.

(10) Patent No.: US 9,589,308 B2
(45) Date of Patent: Mar. 7, 2017

(54) METHODS AND APPARATUS FOR REPRODUCING THE APPEARANCE OF A PHOTOGRAPHIC PRINT ON A DISPLAY DEVICE

(75) Inventors: Aravind Krishnaswamy, San Jose, CA (US); Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 602 days.

(21) Appl. No.: 13/489,176

(22) Filed: Jun. 5, 2012

(65) Prior Publication Data
US 2013/0321618 A1   Dec. 5, 2013

(51) Int. Cl.
*H04N 7/18*      (2006.01)
*G06T 1/00*      (2006.01)
*H04N 5/262*     (2006.01)
*G06T 15/80*     (2011.01)

(52) U.S. Cl.
CPC ............ *G06T 1/0007* (2013.01); *G06T 15/80* (2013.01); *H04N 5/2621* (2013.01); *G06T 2215/16* (2013.01)

(58) Field of Classification Search
CPC .............................. G06T 15/80; G06T 1/0007
USPC .......... 348/135, E07.085; 345/522, 207, 426
See application file for complete search history.

(56) References Cited

U.S. PATENT DOCUMENTS

| | | | |
|---|---|---|---|
| 2003/0179197 A1* | 9/2003 | Sloan .................. | G06T 15/506 345/426 |
| 2007/0139405 A1* | 6/2007 | Marcinkiewicz ............ | 345/207 |
| 2008/0158239 A1* | 7/2008 | Lamy et al. .................. | 345/581 |
| 2009/0079846 A1* | 3/2009 | Chou ......................... | 348/223.1 |
| 2009/0109221 A1* | 4/2009 | Planck et al. ................. | 345/426 |
| 2009/0244125 A1* | 10/2009 | Ozaki et al. ....................... | 347/9 |
| 2010/0110068 A1* | 5/2010 | Yamauchi et al. ............. | 345/419 |
| 2011/0157227 A1* | 6/2011 | Ptucha ................... | H04N 5/232 345/638 |
| 2012/0218191 A1* | 8/2012 | Huang ................... | G06F 1/1643 345/173 |
| 2013/0069924 A1* | 3/2013 | Robinson ................. | G09G 3/20 345/207 |

* cited by examiner

*Primary Examiner* — Richard Torrente
(74) *Attorney, Agent, or Firm* — Wolfe-SBMC

(57) ABSTRACT

Methods and apparatus for reproducing the appearance of a photographic print on a display device are disclosed. An environment model is built from received light conditions at a light sensor attached to a display surface. The environment model and a surface model are applied to an input image to generate an output image. The surface model represents reflective characteristics of a simulated surface on which display of the input image is simulated. The output image simulates an effect of the received light conditions on the input image as simulated on the surface.

19 Claims, 15 Drawing Sheets

*Input image 1000*

METHODS AND APPARATUS FOR REPRODUCING THE APPEARANCE OF A PHOTOGRAPHIC PRINT ON A DISPLAY DEVICE

BACKGROUND

Description of the Related Art

A paper photographic print is a reflective medium. Reflection is the change in direction of a wavefront at an interface between two different media so that the wavefront returns into the medium from which it originated. When light strikes the surface of a (non-metallic) material it bounces off in all directions due to multiple reflections by the microscopic irregularities inside the material, as well as the texture of the material.

In a photographic print, the paper has ink deposited on it. The exact form of the reflection depends on the structure of the material (e.g., the paper and ink). Inks are chemicals that selectively absorb and reflect different spectra of light. When a surface is painted with an ink, light hitting the surface is reflected, minus some wavelengths. This subtraction of wavelengths produces the appearance of different colors. Most inks are a blend of several chemical pigments, intended to produce a reflection of a given color. The final appearance to someone holding the print is a function of the interaction of light from sources in the environment and the reflective properties of the paper and inks on the paper.

The liquid crystal display (LCD) screen of a tablet computer or other LCD display device is, by contrast, an emissive medium. Light of varying wavelengths (colors) is emitted from the screen and has little interaction with the light sources in the environment.

These two display types are fundamentally different, and users are accustomed to the appearance of a print.

SUMMARY

Methods and apparatus for reproducing the appearance of a photographic print on a display device are disclosed. In one embodiment, an environment model is built from received light conditions at a light sensor attached to a display surface. The environment model and a surface model are applied to an input image to generate an output image. The surface model represents reflective characteristics of a simulated surface on which display of the input image is simulated. The output image simulates an effect of the received light conditions on the input image as simulated on the surface.

Figure 1:
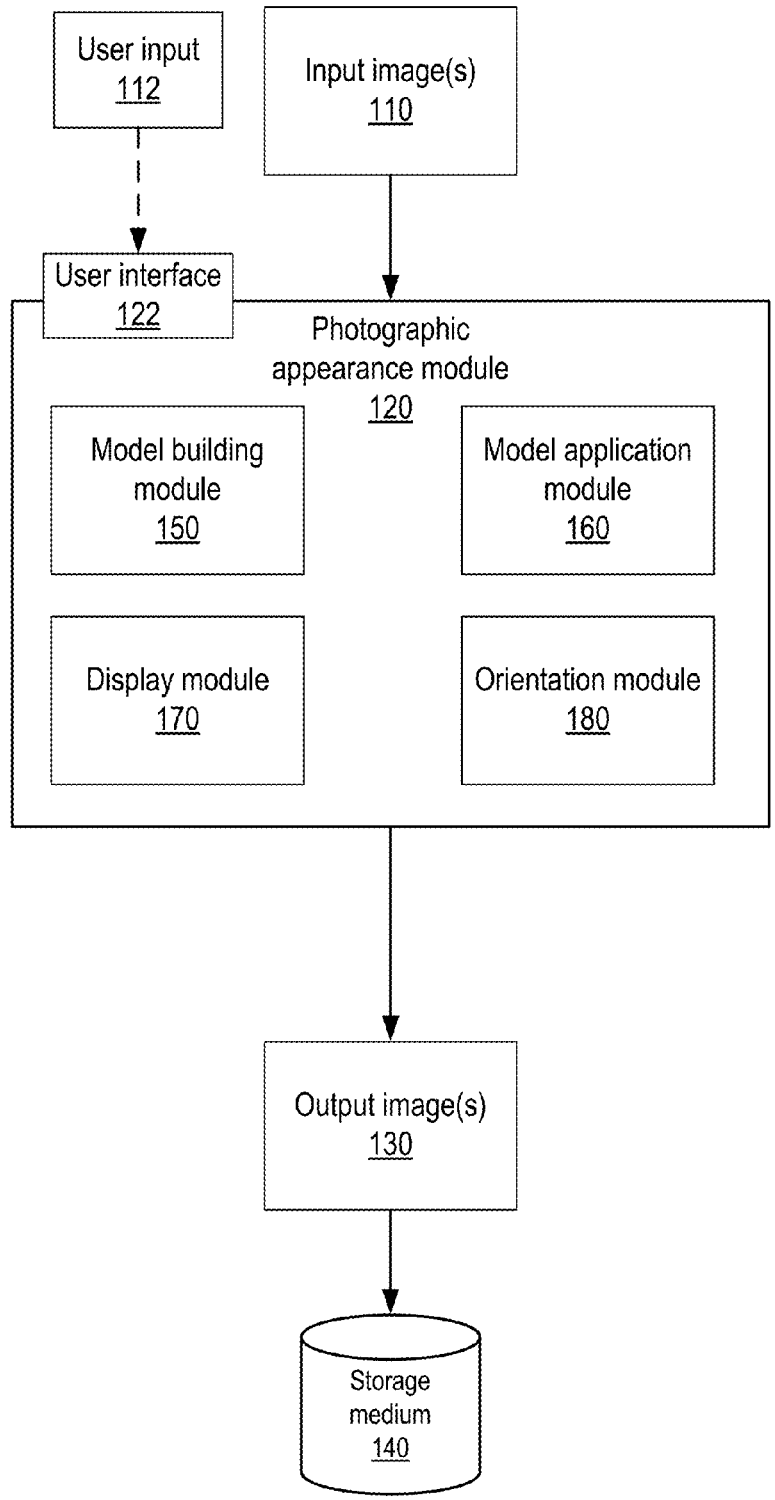
FIG. 1 illustrates a module that may implement reproducing the appearance of a photographic print on a display device, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for reproducing the appearance of a photographic print on a display device perform a method that includes using one or more processors to perform building an environment model from received light conditions at a light sensor attached to a display surface and applying the environment model and a surface model to an input image to generate an output image. In some embodiments, the surface model represents reflective characteristics of a simulated surface on which display of the input image is simulated, and the output image simulates an effect of the received light conditions on the input image as simulated on the surface. In some embodiments, the method includes displaying the output image.

In some embodiments, building the environment model from the received light conditions at the display surface further includes capturing an ambient light image from a front-facing camera oriented with the display surface, calculating an exposure value from the ambient light image from the front-facing camera, building a spherical harmonics environment map from the ambient light image from the front-facing camera, and building an affine matrix for the spherical harmonics map. As used herein, an environment model is a model of the ambient light in a room in which a display surface operates. In some embodiments, environment models are mathematical models of the direction, intensity, and wavelength of light sources providing illumination to a surface of the display device. In some embodiments, the applying the environment model and a surface model to an input image to generate an output image further includes generating a spherical harmonics environment matrix from the environment model, performing a vector matrix multiplication between the spherical harmonics environment matrix and an orientation vector to generate a first result, multiplying the dot product of the first result by an exposure value to generate a second result, and multiplying the second result by an environmental scale factor.

In some embodiments, the method further includes sampling an orientation meter for the display surface to generate the orientation vector. In some embodiments, the method further includes sampling the orientation meter for the display surface to generate a revised orientation vector, computing a diffuse illumination value for the orientation vector, computing a diffuse illumination value for the revised orientation vector, and interpolating between the diffuse illumination value for the orientation vector and the diffuse illumination value for the revised orientation vector over several rendering frames. In some embodiments, the method further includes determining white balance of light conditions at a display surface to determine color temperature of light sources in an environment.

Some embodiments include a means for reproducing the appearance of a photographic print on a display device. For example, a photographic appearance module may include program instructions executable by at least one processor to build an environment model from received light conditions at a light sensor attached to a display surface. The photographic appearance module may include program instructions executable by the at least one processor to apply the environment model and a surface model to an input image to generate an output image. The surface model may represent reflective characteristics of a simulated surface on which display of the input image is simulated, and the output image may simulate an effect of the received light conditions on the input image as simulated on the surface. In some embodiments, the photographic appearance module may include program instructions executable by the at least one processor to display the output image.

In some embodiments, the program instructions executable by the at least one processor to build the environment model from the received light conditions at the display surface further include program instructions executable by the at least one processor to capture an ambient light image from a front-facing camera oriented with the display surface, calculate an exposure value from the ambient light image from the front-facing camera, build a spherical harmonics environment map from the ambient light image from the front-facing camera, and build an affine matrix for the spherical harmonics map.

In some embodiments, the program instructions executable by the at least one processor to apply the environment model and a surface model to an input image to generate an output image further include program instructions executable by the at least one processor to generate a spherical harmonics environment matrix from the environment model, perform a vector matrix multiplication between the spherical harmonics environment matrix and an orientation vector to generate a first result, multiply the dot product of the first result by an exposure value to generate a second result, and multiply the second result by an environmental scale factor.

In some embodiments, the photographic appearance module may include program instructions executable by at least one processor to sample an orientation meter for the display surface to generate the orientation vector. In some embodiments, the photographic appearance module may include program instructions executable by at least one processor to sample the orientation meter for the display surface to generate a revised orientation vector, compute a diffuse illumination value for the orientation vector, compute a diffuse illumination value for the revised orientation vector, and interpolate between the diffuse illumination value for the orientation vector and the diffuse illumination value for the revised orientation vector over several rendering frames.

In some embodiments, the photographic appearance module may include program instructions executable by at least one processor to determine white balance of light conditions at a display surface to determine color temperature of light sources in an environment. In some embodiments, the surface model is represented as a normal map.

The non-uniform photographic appearance module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to build an environment model from received light conditions at a light sensor attached to a display surface and apply the environment model and a surface model to an input image to generate an output image as described herein. The surface model may represent reflective characteristics of a simulated surface on which display of the input image is simulated, and the output image may simulate an effect of the received light conditions on the input image as simulated on the surface. In some embodiments, the photographic appearance module may include program instructions executable by the at least one processor to display the output image. Other embodiments of the photographic appearance module may be at least partially implemented by hardware circuitry and/or firmware stored, for example, in a non-volatile memory.

Introduction to Reproducing the Appearance of a Photographic Print on a Display Device The final appearance of a photographic print is modeled by the bidirectional reflectance distribution function (BRDF) of light reflecting off of the surface of the print. The BRDF describes the manner by which a material attenuates light depending on the incoming direction of light, the outgoing direction of light and the position on the surface. It assumes that the point of the surface for the incoming and outgoing directions of light are the same. In the case of a photographic print, this is a reasonable assumption, as the prints do not exhibit significant subsurface scattering.

Some embodiments simulate the BRDF of a print to approximate the appearance of a real print on a tablet device, in which some embodiments ascertain the light sources in the environment and the changes in the user's position relative to the device.

While the embodiments described herein are discussed as being demonstrated with respect to a still image displayed on a tablet device, one of skill in the art will readily appreciate in view of having read the present disclosure that the technologies described herein are equally applicable to other media types (e.g., video streams, vector artwork) as well as other display apparatus (e.g. larger screen media such as televisions or monitors, and smaller portable screen media such as smartphone or electronic mini-screens such as watches) without departing from the scope and intent of the present disclosure.

Example Implementations

FIG. 1 illustrates a photographic appearance module that may implement reproducing the appearance of a photographic print on a display device, according to some embodiments, as an example of techniques and tools illustrated in FIGS. 2 through 14. Photographic appearance module 120 may, for example, implement one or more of a light-based photographic print reflection tool, a photographic appearance reproduction tool, and a lighting simulation image display tool. FIG. 15 illustrates an example computer system on which embodiments of photographic appearance module 120 may be implemented. Photographic appearance module 120 receives as input one or more digital input images 110. An example input image is shown in FIG. 10.

Photographic appearance module 120 may receive user input 112 activating a light-based photographic print reflection tool, a photographic appearance reproduction tool, or a lighting simulation image display tool. Photographic appearance module 120 then edits the input image(s) 110, according to user input 112 received via user interface 122, using the activated light-based photographic print reflection tool, a photographic appearance reproduction tool, or a lighting simulation image display tool. The light-based photographic print reflection tool, a photographic appearance reproduction tool, or a lighting simulation image display tool may update the image based on further user input, changes to orientation of the device, or changes in received light. Photographic appearance module 120 generates as output one or more output images 130. Output image(s) 130 may, for example, be stored to a storage medium 140, such as system memory, a disk drive, DVD, CD, etc.

In some embodiments, photographic appearance module 120 may provide a user interface 122 via which a user may interact with the photographic appearance module 120, for example to activate a light-based photographic print reflection tool, a photographic appearance reproduction tool, or a lighting simulation image display tool, and to perform a method for reproducing the appearance of a photographic print on a display device as described herein. In some embodiments, the user interface may provide user interface elements whereby the user may select options including, but not limited to, the light sensing mode, updating frequency, and/or simulated paper texture.

In some embodiments, photographic appearance module 120 includes a model building module 150 for building an environment model from received light conditions at a light sensor attached to a display surface, for example a camera on a tablet device. In some embodiments, model building module 150 further performs capturing an ambient light image from a front-facing camera oriented with the display surface, calculating an exposure value from the ambient light image from the front-facing camera, building a spherical harmonics environment map from the ambient light image from the front-facing camera, and building an affine matrix for the spherical harmonics map. In some embodiments, model building module 150 further performs determining white balance of light conditions at a display surface to determine color temperature of light sources in an environment.

In some embodiments, photographic appearance module 120 includes a model application module 160 for applying the environment model and a surface model to an input image to generate an output image. In some embodiments, the surface model represents reflective characteristics of a simulated surface on which display of the input image is simulated, and the output image simulates an effect of the received light conditions on the input image as simulated on the surface. In some embodiments, model application module 160 performs generating a spherical harmonics environment matrix from the environment model, performing a vector matrix multiplication between the spherical harmonics environment matrix and an orientation vector to generate a first result, multiplying the dot product of the result by an exposure value to generate a second result, and multiplying the second result by an environmental scale factor. In some embodiments, model application module 160 performs computing a diffuse illumination value for the orientation vector, computing a diffuse illumination value for the revised orientation vector, and interpolating between the diffuse illumination value for the orientation vector and the diffuse illumination value for the revised orientation vector over several rendering frames.

In some embodiments, photographic appearance module 120 includes a display module 170 for displaying the output image, for example by sending the output image to a display screen of a tablet device. In some embodiments, an orientation module 180 performs sampling an orientation meter for the display surface to generate the orientation vector. In some embodiments, an orientation module 180 performs sampling the orientation meter for the display surface to generate a revised orientation vector. In some embodiments, the surface model is represented as a normal map.

Figure 2:
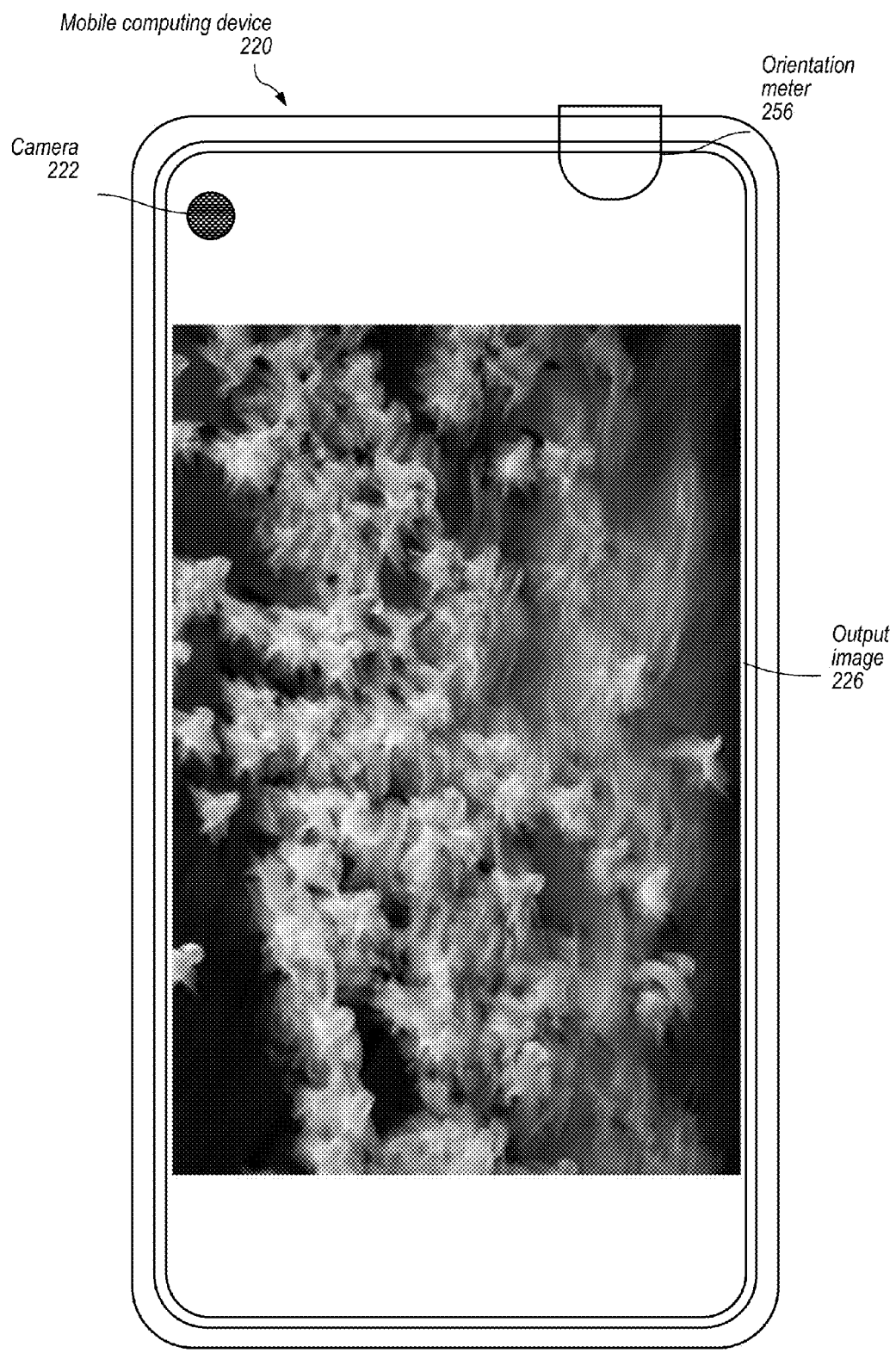
FIG. 2 depicts a display device that may implement reproducing the appearance of a photographic print on a display device, according to some embodiments.

FIG. 2 depicts a display device that may implement reproducing the appearance of a photographic print on a display device, according to some embodiments. A mobile computing device 220 includes an orientation meter 256, such as a gyroscope or accelerometer, a camera 222, and a display screen for showing an output image 226. In some embodiments, mobile computing device 220 executes a photographic appearance module, such as photographic appearance module 120 of FIG. 1, described above, and includes computing components such as those described below with respect to FIG. 15.

Figure 3:
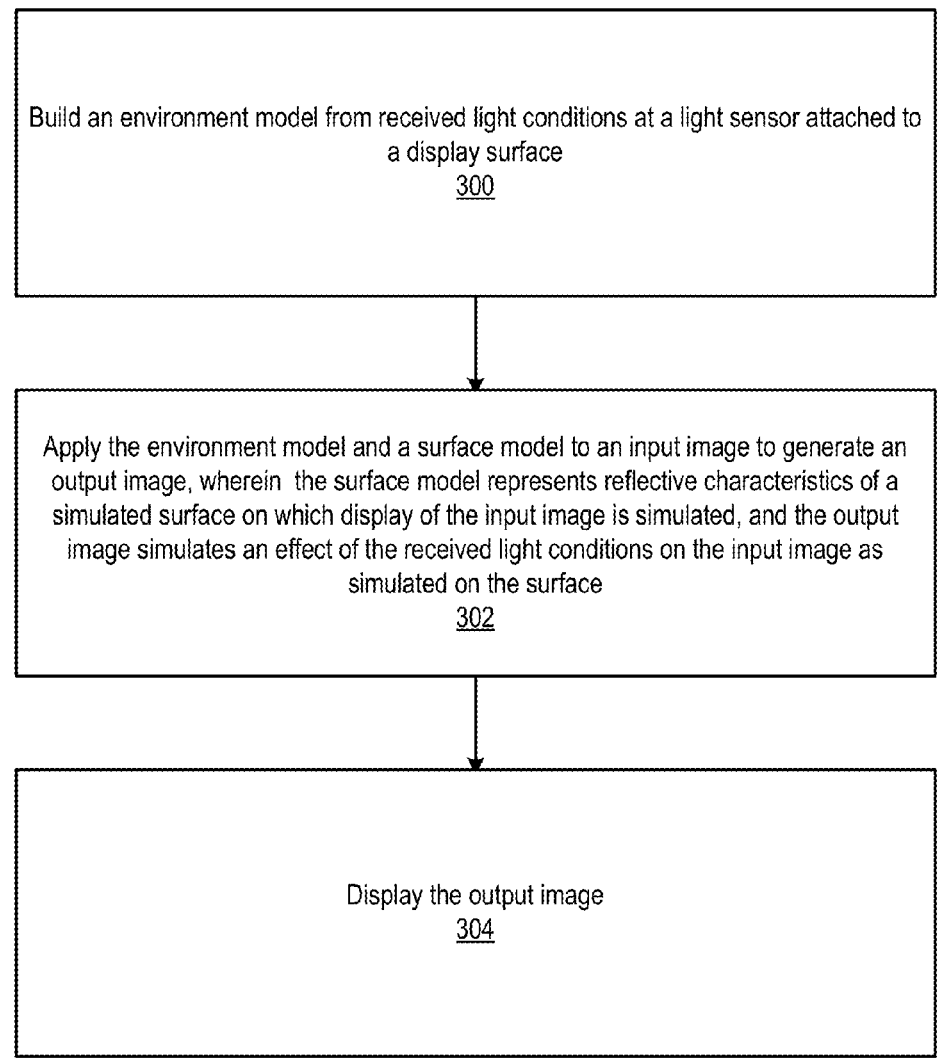
FIG. 3 is a flowchart of operations usable in implementing reproducing the appearance of a photographic print on a display device, according to some embodiments.

FIG. 3 is a flowchart of operations usable in implementing reproducing the appearance of a photographic print on a display device, according to some embodiments. An environment model is built from received light conditions at a light sensor attached to a display surface (block 300). The environment model and a surface model are applied to an input image to generate an output image, wherein the surface model represents reflective characteristics of a simulated surface on which display of the input image is simulated, and the output image simulates an effect of the received light conditions on the input image as simulated on the surface (block 302). The output image is displayed (block 304).

Figure 4:
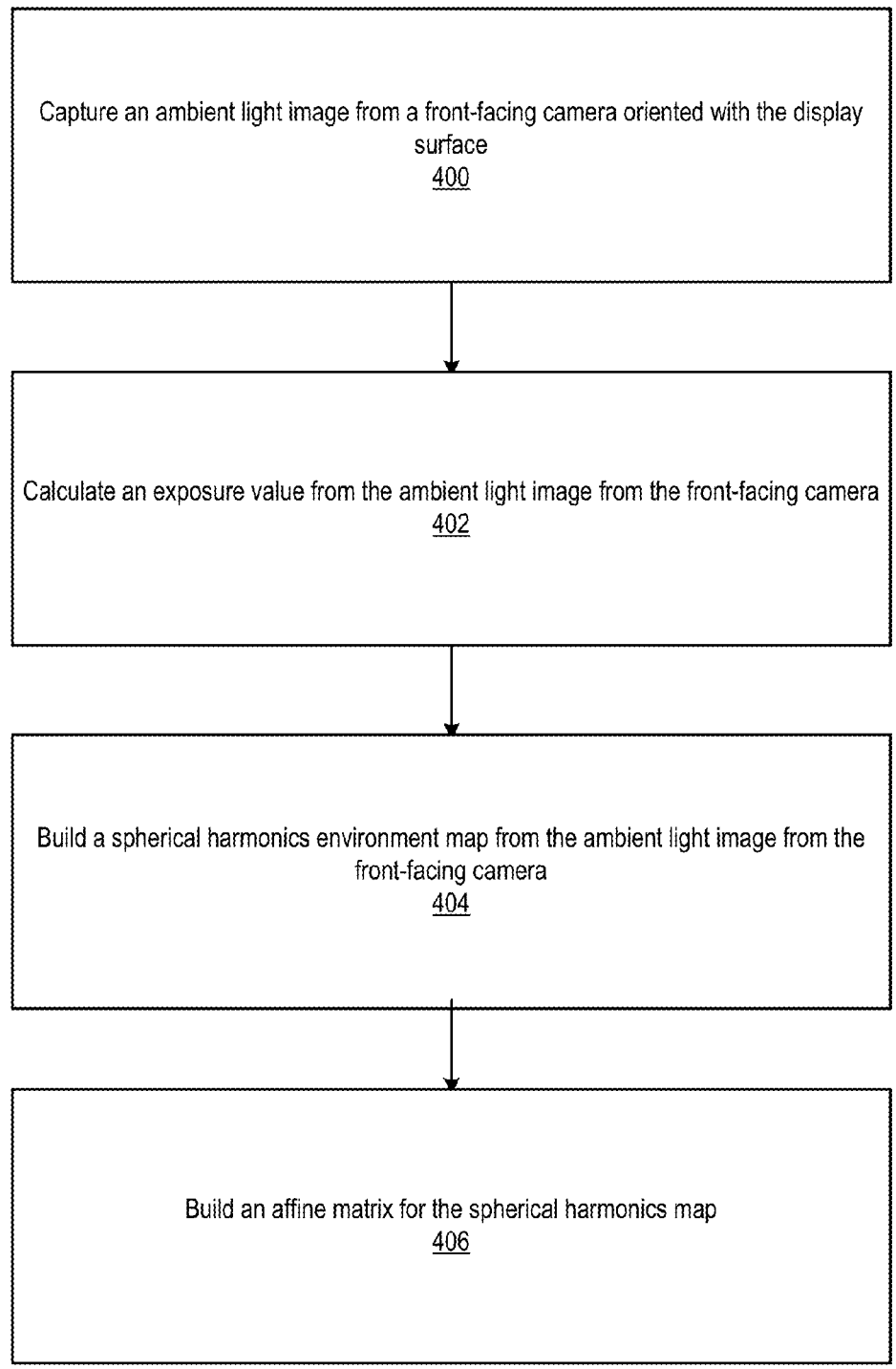
FIG. 4 is a flowchart of operations usable in building an environment model from received light conditions at a display surface for use in implementing reproducing the appearance of a photographic print on a display device, according to some embodiments.

FIG. 4 is a flowchart of operations usable in building an environment model from received light conditions at a display surface for use in implementing reproducing the appearance of a photographic print on a display device, according to some embodiments. An ambient light image from a front-facing camera oriented with the display surface is captured (block 400). An exposure value from the ambient light image from the front-facing camera is calculated (block 402). A spherical harmonics environment map is built from the ambient light image from the front-facing camera (block 404). An affine matrix is built for the spherical harmonics map (block 406).

Figure 5:
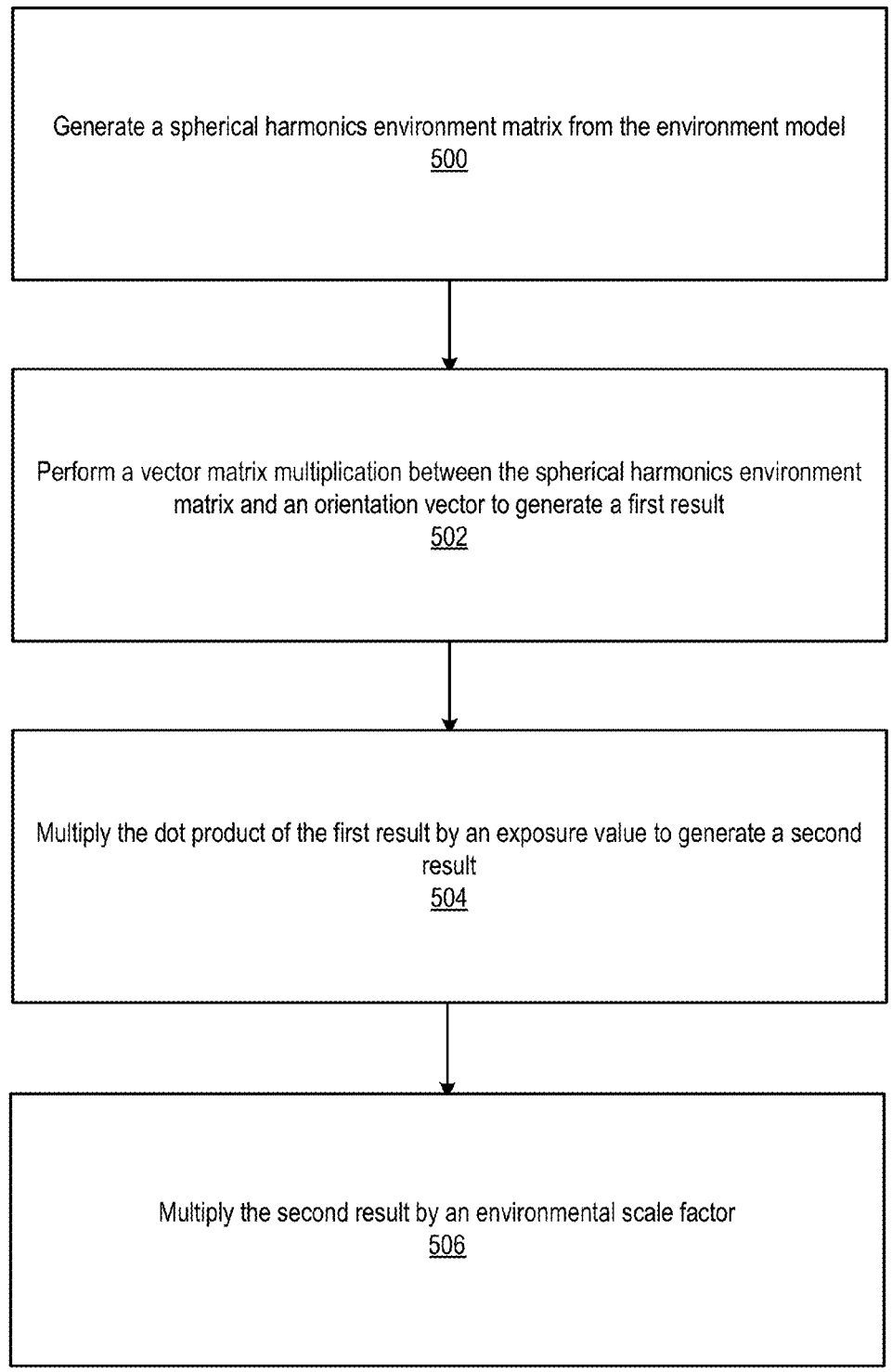
FIG. 5 is a flowchart of operations usable in applying an environment model and a surface model to an input image to generate an output image for use in implementing reproducing the appearance of a photographic print on a display device, according to some embodiments.

FIG. 5 is a flowchart of operations usable in applying an environment model and a surface model to an input image to generate an output image for use in implementing reproducing the appearance of a photographic print on a display device, according to some embodiments. A spherical harmonics environment matrix is built from the environment model (block 500). A vector matrix multiplication between the spherical harmonics environment matrix and an orientation vector is performed to generate a first result (block 502). Multiplication of the dot product of the first result by an exposure value is performed to generate a second result (block 504). The second result is multiplied by an environmental scale factor (block 506).

Figure 6:
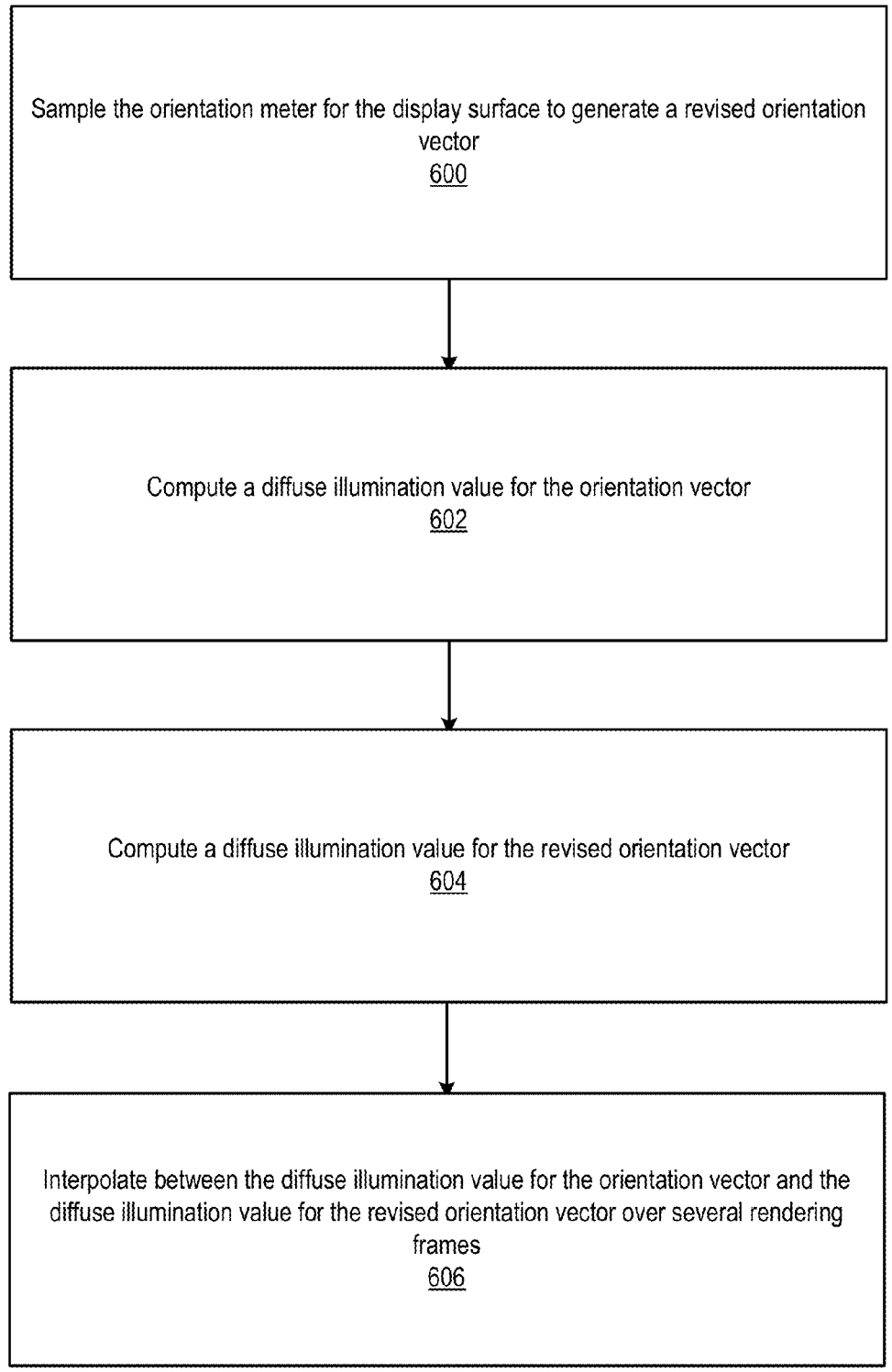
FIG. 6 is a flowchart of operations usable in responding to a change in an orientation of a display device during use in implementing reproducing the appearance of a photographic print on a display device, according to some embodiments.

FIG. 6 is a flowchart of operations usable in responding to a change in an orientation of a display device during use in implementing reproducing the appearance of a photographic print on a display device, according to some embodiments. The orientation meter for the display surface is sampled to generate a revised orientation vector (block 600). A diffuse illumination value for the orientation vector is computed (block 602). A diffuse illumination value for the revised orientation vector is computed (block 604). Interpolation is performed between the diffuse illumination value for the orientation vector and the diffuse illumination value for the revised orientation vector over several rendering frames (block 606).

Figure 7:
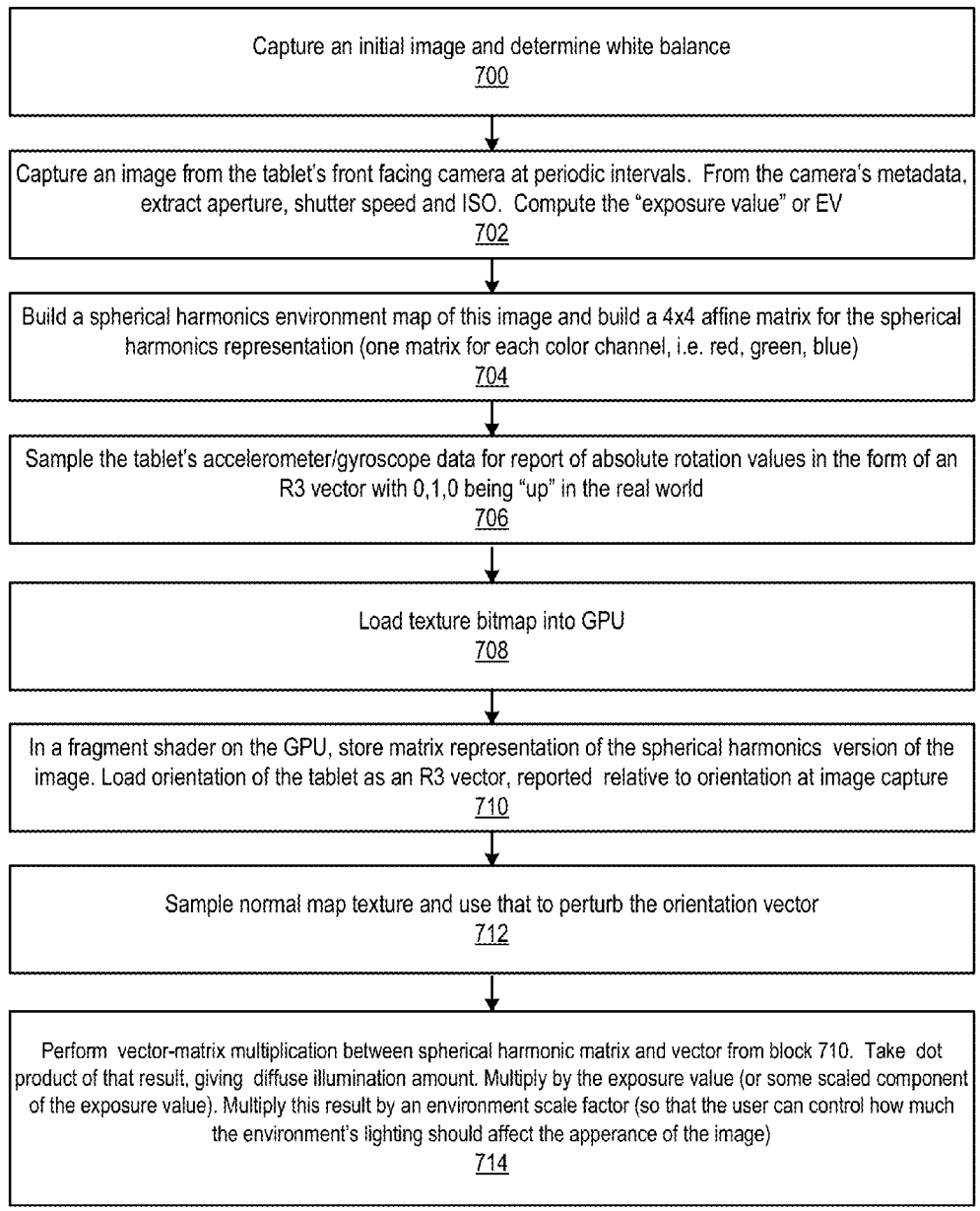
FIG. 7 is a flowchart of operations usable in implementing reproducing the appearance of a photographic print on a display device, according to some embodiments.

FIG. 7 is a flowchart of operations usable in implementing reproducing the appearance of a photographic print on a display device, according to some embodiments. An initial image is captured and white balance is determined (block 700). An image is captured from the tablet's front facing camera at periodic intervals. From the camera's metadata, aperture, shutter speed and ISO are extracted. The "exposure value" or EV is computed. (block 702). A spherical harmonics environment map of this image and \ a 4×4 affine matrix for the spherical harmonics representation (one matrix for each color channel, i.e. red, green, blue) are built (block 704). The tablet's accelerometer/gyroscope data is sampled for a report of absolute rotation values in the form of an R3 vector with 0,1,0 being "up" in the real world. (block 706).

A texture bitmap is loaded into the GPU (block 708). In a fragment shader on the GPU, a matrix representation of the spherical harmonics version of the image is stored. Orientation of the tablet is loaded as an R3 vector, reported relative to orientation at image capture (block 710). The normal texture map is sampled and used to perturb the orientation vector (block 712). Vector-matrix multiplication is performed between the spherical harmonic matrix and the vector from block 710. A dot product of that result is taken, giving a diffuse illumination amount, which is multiplied by the exposure value (or some scaled component of the exposure value). This result is multiplied by an environment scale factor (so that the user can control how much the environment's lighting should affect the appearance of the image) (block 714).

One embodiment includes an algorithm as described below:
1. Capture an initial image and to determine white balance
2. Capture an image from the tablet's front facing camera at periodic intervals (e.g., some embodiments use 1 image/second). From the camera's metadata, some embodiments pull out the aperture, shutter speed and ISO and using these three variables compute the "exposurevalue" or EV. From literature 0 EV=ISO 100 @ f/1 @ 1 s.
3. Build a spherical harmonics environment map of this image and build a 4×4 affine matrix for the spherical harmonics representation (one matrix for each color channel, i.e. red, green, blue).
4. Sample the tablet's accelerometer/gyroscope data. Currently available tablets report absolute rotation values in the form of an R3 vector with 0,1,0 being "up" in the real world.
5. Use scans of different papers for paper texture and create a normal map image to represent the texture. This bitmap image is loaded onto the GPU as a texture.
6. In a fragment shader on the GPU, store have the matrix representation of the spherical harmonics version of the image and load the orientation of the tablet as a R3 vector. The orientation is relative to the orientation as recorded at image capture time.

7. Sample the normal map texture and use that perturb the orientation vector.
8. Perform a vector-matrix multiplication between the spherical harmonic matrix and the vector from step 6 and then take the dot product of that result, giving the diffuse illumination amount. This amount is then multiplied by the exposure value (or some scaled component of the exposure value). This result is then multiplied by an environment scale factor (so that the user can control how much the environment's lighting should affect the appearance of the image).

With the basic steps of the algorithm discussed above, some embodiments illuminate a print with the diffuse lighting in a selected environment.

Figure 8:
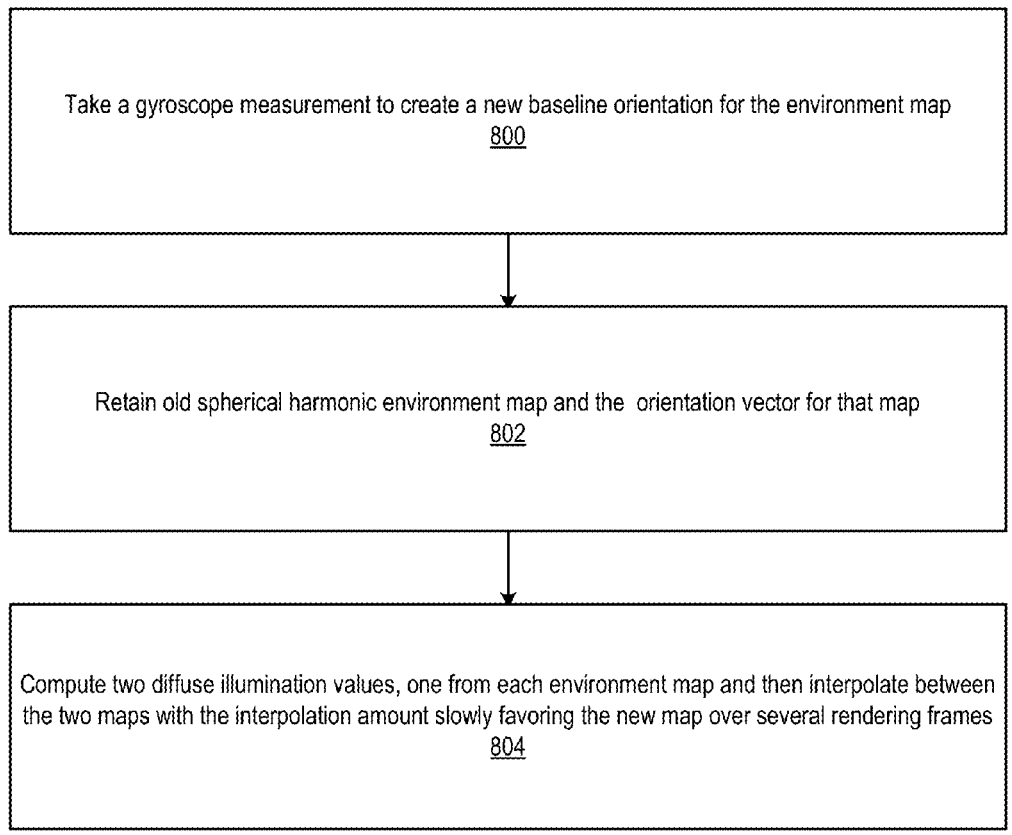
FIG. 8 is a flowchart of operations usable in implementing updating the appearance of a photographic print on a display device, according to some embodiments.

FIG. 8 is a flowchart of operations usable in implementing updating the appearance of a photographic print on a display device, according to some embodiments. A gyroscope measurement is taken to create a new baseline orientation for the environment map (block 800). An old spherical harmonic environment map and the orientation vector for that map are retained (block 802). Two diffuse illumination values are computed, one from each environment map, and interpolation between the two maps is performed with the interpolation amount slowly favoring the new map over several rendering frames (block 804).

An algorithm for generating a smooth transition in the appearance of the image as the lighting in the environment changes is discussed below. As the user rotates the tablet, the appearance due to paper texture also changes. Each time a new image is captured from the camera (some embodiments set a capture rate at 1 image/sec for ease of handling that data rate). An example embodiment includes:

1. Immediately take a gyroscope measurement to create a new baseline orientation for that environment map.
2. Remember the old spherical harmonic environment map and the orientation vector for that map.
3. Compute two diffuse illumination values, one from each environment map and then interpolate between the two maps with the interpolation amount slowly favoring the new map over several rendering frames.
4. As an alternative to step 3, some embodiments interpolate the spherical harmonic coefficients and the baseline orientation vectors.

Figure 9:
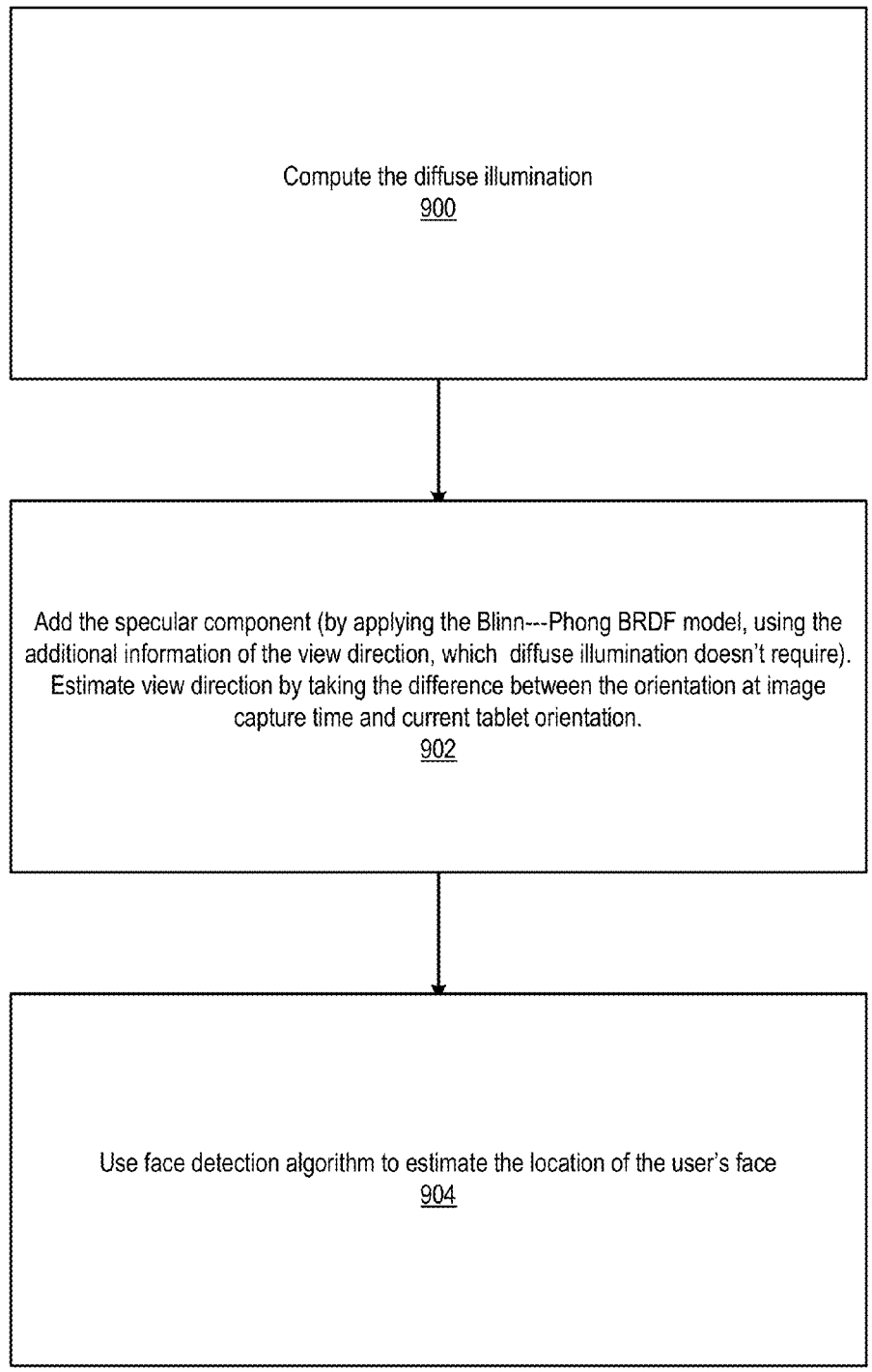
FIG. 9 is a flowchart of operations usable in implementing reproducing a glossy appearance of a photographic print on a display device, according to some embodiments.
Figure 10:
FIG. 10 is an example input image usable in implementing reproducing the appearance of a photographic print on a display device, according to some embodiments.

FIG. 9 is a flowchart of operations usable in implementing reproducing a glossy appearance of a photographic print on a display device, according to some embodiments. Diffuse illumination is computed (block 900). A specular component is added (by applying the Blinn-Phong BRDF model, using the additional information of the view direction, which diffuse illumination doesn't require). View direction is estimated by taking the difference between the orientation at image capture time and current tablet orientation. (block 902). A face detection algorithm is used to estimate the location of the user's face (block 904).

Though many papers have a matte appearance (where a diffuse value as described being computed above will suffice in capturing its appearance), there are many paper types that have some level of glossiness. To capture glossy appearance some embodiments:

1. Compute the diffuse illumination as described up to Step 7 above.
2. Add the specular component (by applying the Blinn-Phong BRDF model). The Blinn-Phong model uses the additional information of the view direction (the diffuse illumination doesn't require view direction since the amount of light reflected is the same in all directions). Embodiments estimate this view direction by taking the difference between the orientation at image capture time and current tablet orientation. This way as the user rotates the tablet, an appearance of shininess can be simulated
3. Some embodiments further extend this by using an off-the-shelf face detection algorithm to estimate the position of a user face relative to the display device.

FIG. 10 is an example input image usable in implementing reproducing the appearance of a photographic print on a display device, according to some embodiments. Embodiments apply the methods described herein to input image 1000 to generate the output images shown in FIGS. 11-14.

Figure 11:
FIG. 11 is an example output image resulting from implementing reproducing the appearance of a photographic print on a display device, according to some embodiments.

FIG. 11 is an example output image resulting from implementing reproducing the appearance of a photographic print on a display device, according to some embodiments. An output image 1100 is displayed on a display device 1110 illuminated by window light on a cloudy day.

Figure 12:
FIG. 12 is an example output image resulting from implementing reproducing the appearance of a photographic print on a display device, according to some embodiments.

FIG. 12 is an example output image resulting from implementing reproducing the appearance of a photographic print on a display device, according to some embodiments. An output image 1200 is displayed on a display device 1210 illuminated by light from a tungsten bulb, a reflection 1220 of which is noted.

Figure 13:
FIG. 13 is an example output image resulting from implementing reproducing the appearance of a photographic print on a display device, according to some embodiments.

FIG. 13 is an example output image resulting from implementing reproducing the appearance of a photographic print on a display device, according to some embodiments. An output image 1300 is displayed on a display device 1310 illuminated by direct sunlight reflected from a large yellow wall in a room with green walls.

Figure 14:
FIG. 14 is an example output image resulting from implementing reproducing the appearance of a photographic print on a display device, according to some embodiments.
Figure 15:
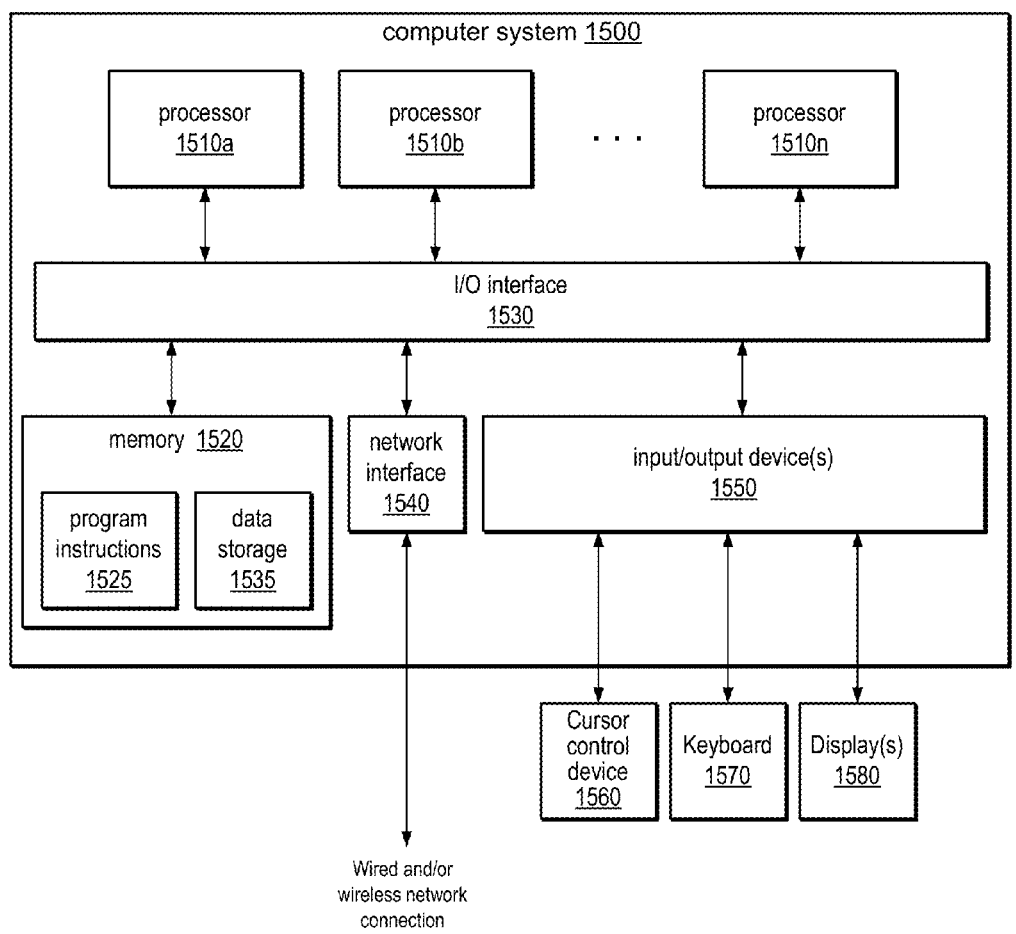
FIG. 15 illustrates an example computer system that may be used in embodiments.

FIG. 14 is an example output image resulting from implementing reproducing the appearance of a photographic print on a display device, according to some embodiments. An output image 1400 is displayed on a display device 1410 illuminated by indirect sunlight in a room with red walls.

Example System

Embodiments of a photographic appearance module and/or of the various techniques for reproducing the appearance of a photographic print on a display device as described herein may be executed on one or more computer systems, which may interact with various other devices. One such computer system is illustrated by FIG. 15. In different embodiments, computer system 1500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some embodiments, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

In some embodiments, at least one processor 1510 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a photographic appearance module are shown stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include storage media or memory media such as magnetic or optical media, e.g., disk or CD/DVD-ROM coupled to computer system 1500 via I/O interface 1530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement embodiments of a photographic appearance module as described herein, and data storage 1535, comprising various data accessible by program instructions 1525. In one embodiment, program instructions 1525 may include software elements of embodiments of a photographic appearance module as illustrated in the above Figures. Data storage 1535 may include data that may be used in embodiments. In other embodiments, other or different software elements and data may be included.

Those skilled in the art will appreciate that computer system 1500 is merely illustrative and is not intended to limit the scope of a photographic appearance module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
    detecting light conditions at a light sensor attached to a display surface;
    generating an environment model based on the light conditions;
    generating a surface model by utilizing a texture map image of a paper to model a simulation of a surface texture of the paper, the surface model representing reflective characteristics of ink on the paper;
    applying both the environment model and the surface model to an input image to generate an output image, such that the output image simulates an appearance of the input image having the reflective characteristics of the ink on the paper; and
    displaying the output image.

2. The method of claim 1, wherein detecting light conditions at a light sensor attached to a display surface further comprises capturing an ambient light image from a camera oriented with the display surface, and the generating the environment model based on the light conditions further comprises:
    calculating an exposure value from the ambient light image from the camera oriented with the display surface;
    building a spherical harmonics environment map from the ambient light image from the camera oriented with the display surface; and
    building an affine matrix for the spherical harmonics map.

3. The method of claim 1, wherein the applying the environment model and the surface model to an input image to generate an output image further comprises:
    generating a spherical harmonics environment matrix from the environment model;
    performing a vector matrix multiplication between the spherical harmonics environment matrix and an orientation vector to generate a first result;
    multiplying the dot product of the result by an exposure value to generate a second result; and
    multiplying the second result by an environment scale factor.

4. The method of claim 3, further comprising:
    sampling an orientation meter for the display surface to generate the orientation vector.

5. The method of claim 4, further comprising:
    sampling the orientation meter for the display surface to generate a revised orientation vector;
    computing a diffuse illumination value for the orientation vector;
    computing a diffuse illumination value for the revised orientation vector; and
    interpolating between the diffuse illumination value for the orientation vector and the diffuse illumination value for the revised orientation vector over several rendering frames.

6. The method of claim 1, further comprising determining white balance of light conditions at a display surface to determine color temperature of light sources in an environment.

7. The method of claim 1, wherein the surface model is represented as a normal map.

8. A system, comprising:
    at least one processor; and
    a memory comprising program instructions, wherein the program instructions are executable by the at least one processor to:
        detect light conditions at a light sensor attached to a display surface;
        sample an orientation meter for the display surface to generate an orientation vector;
        generate an environment model based on the light conditions and the orientation vector;
        generate a surface model by utilizing a texture map image of a paper to model a simulation of a surface texture of the paper, the surface model representing reflective characteristics of ink on the paper;
        apply both the environment model and the surface model to an input image to generate an output image, such that the output image simulates an appearance of the input image having the reflective characteristics of the ink on the paper; and
        display the output image.

9. The system of claim 8, wherein the program instructions executable by the at least one processor to detect light conditions at a light sensor attached to a display surface further comprise program instructions executable by the at least one processor to capture an ambient light image from a camera oriented with the display surface, and the program instructions executable by the at least one processor to generate the environment model from the received light conditions at the display surface further comprise program instructions executable by the at least one processor to:
  calculate an exposure value from the ambient light image from the camera oriented with the display surface;
  build a spherical harmonics environment map from the ambient light image from the camera oriented with the display surface; and
  build an affine matrix for the spherical harmonics map.

10. The system of claim 8, wherein the program instructions executable by the at least one processor to generate the environment model from the received light conditions at the display surface further comprise program instructions executable by the at least one processor to:
  generate a spherical harmonics environment matrix from the environment model;
  perform a vector matrix multiplication between the spherical harmonics environment matrix and the orientation vector to generate a first result;
  multiply the dot product of the result by an exposure value to generate a second result; and
  multiply the second result by an environmental scale factor.

11. The system of claim 10, further comprising program instructions executable by the at least one processor to:
  sample the orientation meter for the display surface to generate a revised orientation vector;
  compute a diffuse illumination value for the orientation vector;
  compute a diffuse illumination value for the revised orientation vector; and
  interpolate between the diffuse illumination value for the orientation vector and the diffuse illumination value for the revised orientation vector over several rendering frames.

12. The system of claim 8, further comprising program instructions executable by the at least one processor to determine white balance of light conditions at a display surface to determine color temperature of light sources in an environment.

13. The system of claim 8, wherein the surface model is represented as a normal map.

14. A non-transitory computer-readable storage medium storing program instructions, wherein the program instructions are computer-executable to implement:
  detecting light conditions at a light sensor attached to a display surface;
  generating an environment model based on the light conditions;
  generating a surface model by utilizing a texture map image of a paper to model a simulation of a surface texture of the paper, the surface model representing reflective characteristics of ink on the paper;
  applying both the environment model and the surface model to an input image to generate an output image, such that the output image simulates an appearance of the input image having the reflective characteristics of the ink on the paper; and
  displaying the output image.

15. The non-transitory computer-readable storage medium of claim 14, wherein the program instructions computer-executable to implement detecting light conditions at a light sensor attached to a display surface further comprises capturing an ambient light image from a camera oriented with the display surface, and generating the environment model from the received light conditions at the display surface further comprise program instructions computer-executable to implement:
  calculating an exposure value from the ambient light image from the camera oriented with the display surface;
  building a spherical harmonics environment map from the ambient light image from the camera oriented with the display surface; and
  building an affine matrix for the spherical harmonics map.

16. The non-transitory computer-readable storage medium of claim 14, wherein the program instructions computer-executable to implement applying the environment model and the surface model to an input image to generate an output image further comprise program instructions computer-executable to implement:
  generating a spherical harmonics environment matrix from the environment model;
  performing a vector matrix multiplication between the spherical harmonics environment matrix and an orientation vector to generate a first result;
  multiplying the dot product of the result by an exposure value to generate a second result; and
  multiplying the second result by an environment scale factor.

17. The non-transitory computer-readable storage medium of claim 16, further comprising program instructions computer-executable to implement:
  sampling an orientation meter for the display surface to generate the orientation vector.

18. The non-transitory computer-readable storage medium of claim 17, further comprising program instructions computer-executable to implement:
  sampling the orientation meter for the display surface to generate a revised orientation vector;
  computing a diffuse illumination value for the orientation vector;
  computing a diffuse illumination value for the revised orientation vector; and
  interpolating between the diffuse illumination value for the orientation vector and the diffuse illumination value for the revised orientation vector over several rendering frames.

19. The non-transitory computer-readable storage medium of claim 14, further comprising program instructions computer-executable to implement determining white balance of light conditions at a display surface to determine color temperature of light sources in an environment.

* * * * *